No. 609,142. Patented Aug. 16, 1898.
J. C. DAGONEAU.
COMBINED BATTERY AND ELECTRIC CELL.
(Application filed Jan. 15, 1895.)
(No Model.)
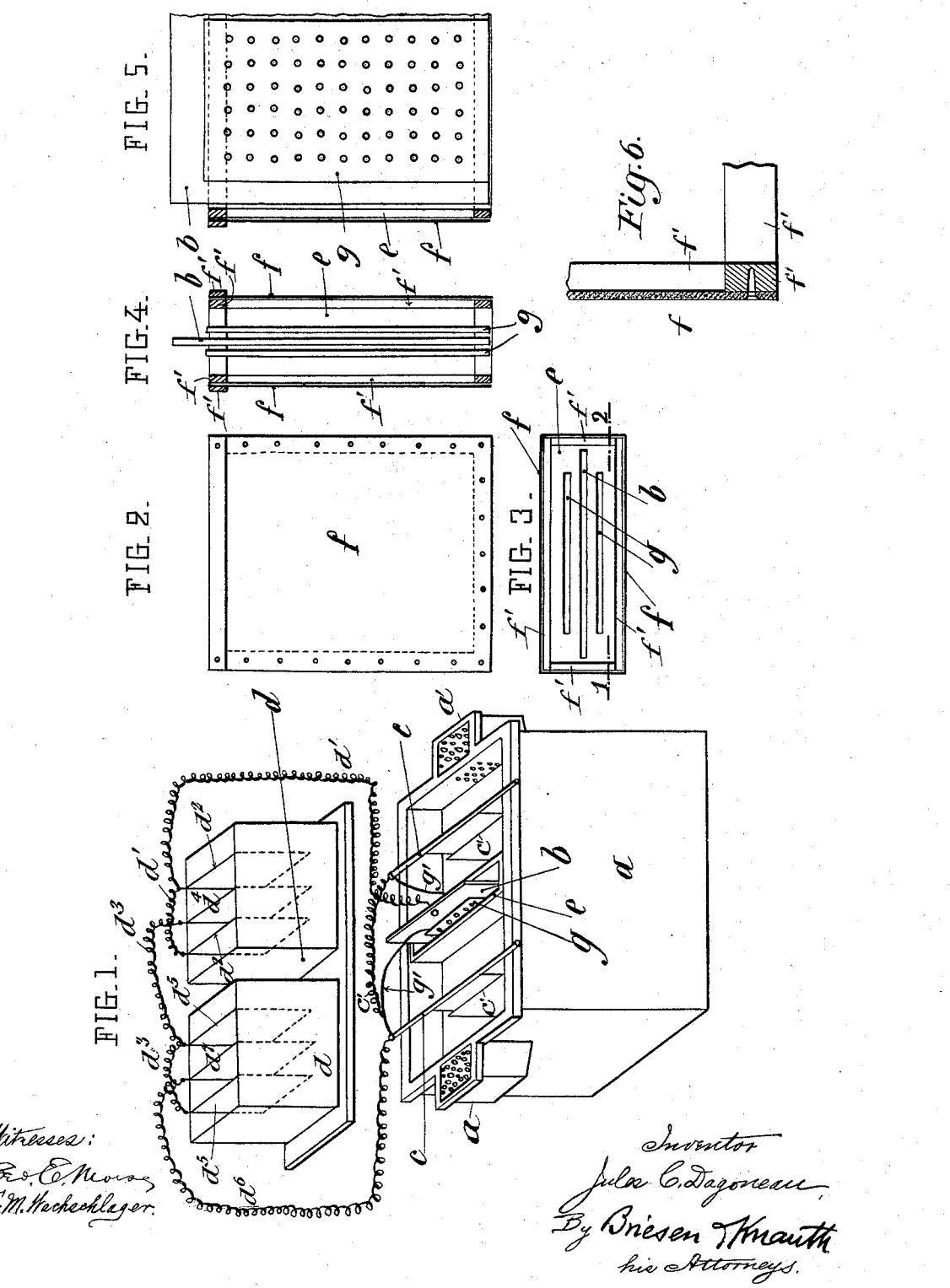

UNITED STATES PATENT OFFICE.

JULES CELESTIN DAGONEAU, OF BEAUFORT, FRANCE.

COMBINED BATTERY AND ELECTRIC CELL.

SPECIFICATION forming part of Letters Patent No. 609,142, dated August 16, 1898.

Application filed January 15, 1895. Serial No. 534,997. (No model.)

*To all whom it may concern:*

Be it known that I, JULES CELESTIN DAGONEAU, of the city of Beaufort, (Maine and Loire,) France, have invented a Combined Battery and Electric Cell, of which the following is a full, clear, and exact description.

My invention consists in a combined battery and electrolytic cell.

Reference is to be had to the accompanying drawings, forming part of this specification, wherein—

Figure 1 shows in perspective a general view of the combined battery and electrolytic cell embodying my invention and the apparatus for utilizing the current produced. Fig. 2 is an elevation of a portion of a cell embodying my invention, the same being the compartment inclosing the zinc plate. Fig. 3 is a plan view thereof; Fig. 4, a transverse section thereof; Fig. 5, a longitudinal section on line 1 2 of Fig. 3, and Fig. 6 an enlarged detail view of the lower left-hand corner of the sectional view Fig. 4.

In the drawings, $a$ is a combined battery and electrolytic cell, containing a solution of copper sulfate and a cup or cell $e$ for containing the zinc element, comprising a rectangular frame formed of joined slats $f'$, over which slats are diaphragms $f$ of parchment, bladder, or other membrane. This cell contains dilute sulfuric acid and a zinc plate $b$. The cell $a$ is shown as provided with side troughs $a'$, containing sulfate of copper. The metallic articles $c'$ to be plated are suspended from the bars $c$ and dip into the sulfate-of-copper solution. Instead of connecting the zinc element $b$ directly with the bars $c$ I interpolate in the circuit connections, between the said zinc element and the bars $c$, one or more accumulators $d$, thus: A wire $d'$ leads from the zinc element $b$ to the plates $d^2$ of an accumulator. Thence the circuit continues by way of wire $d^3$ from the accumulator-plate $d^4$ to the accumulator-plates $d^5$ of the adjacent accumulator. Thence the circuit proceeds by wire $d^6$ from the accumulator-plate $d^7$ to the bars $c$, which may be electrically connected by wire $c'$.

In order to protect the zinc plate from receiving a copper deposit from the sulfate of copper which penetrates the diaphragm or membrane $f$, I interpose between the said zinc plate and the porous membrane or diaphragm perforated lead plates $g$, which are electrically connected with the suspension-bars $c$ by connections $g'$ and insulated electrically from the plate $b$, whence it will be obvious that any copper solution which may be carried osmotically through the diaphragm will be deposited on the lead plate or plates and will not be deposited on the zinc plate, thereby obviating a common fault in galvano-plastic operations of this character. It will likewise be observed that the internal resistance of the cell is greatly decreased by dispensing with porcelain diaphragms and using membranes. Hence it will be obvious that by my invention I not only utilize the current generated for purposes other than the galvano-plastic operations, but likewise increase the electrical efficiency of the entire apparatus by decreasing the internal resistance and preventing the deposition of copper upon the zinc plate.

What I claim, and desire to secure by Letters Patent, is—

In a combined battery and electrolytic cell, the combination of a cell or container $a$ containing sulfate of copper, an interior cell or container contained therein and comprising a rectangular framework of slats $f'$ and membranes $f$ secured upon this framework and constituting the walls of the interior cell, a zinc element and dilute sulfuric acid contained in the said interior cell, suspension-bars $c$ adapted to suspend the articles to be plated, circuit connections between the zinc plate and the bars $c$ and one or more perforated lead plates in the interior cell upon which a copper deposit will be made.

JULES CELESTIN DAGONEAU.

Witnesses:
 EDWARD P. MACLEAN,
 ALBERT MOREAU.